United States Patent [19]

Marty

[11] Patent Number: 5,451,287
[45] Date of Patent: Sep. 19, 1995

[54] MACHINE FOR WRAPPING TUBULAR MARKERS WITH A REFLECTIVE MATERIAL

[75] Inventor: John L. Marty, White Bear Lake, Minn.

[73] Assignee: Minnesota Mining and Manufacturing Company, St. Paul, Minn.

[21] Appl. No.: 169,437

[22] Filed: Dec. 17, 1993

[51] Int. Cl.6 .............................................. B32B 31/00
[52] U.S. Cl. ................... 156/446; 156/184; 156/187; 156/215
[58] Field of Search ............... 156/184, 187, 215, 446, 156/447, 450, 456, 457, 458, 475, 481, 521, 540, 541, 542, 553, 555

[56] References Cited

U.S. PATENT DOCUMENTS

| 727,664 | 5/1803 | Milne | 156/446 |
| 3,008,866 | 11/1961 | Kingsley | 156/540 |
| 4,441,948 | 4/1984 | Gillard et al. | 156/446 X |
| 5,047,107 | 9/1991 | Keller et al. | 156/184 |

Primary Examiner—James J. Engel
Attorney, Agent, or Firm—Gary L. Griswold; Walter N. Kirn; Robert H. Jordan

[57] ABSTRACT

The invention relates to an automated apparatus for automatic placement of a retroreflective sheeting material on markers used for the channelization of traffic. The apparatus includes a spool member to dispense the retroreflective sheeting and receive the liner material removed from the retroreflective sheeting during dispensing. The apparatus also includes a roller mechanism for advancing and positioning the retroreflective sheeting. A drive mechanism for regulating the advancement and position of the retroreflective sheeting to provide a precise length of the retroreflective sheeting according to the size of the marker is also included in the apparatus. The apparatus also comprises a positioning mechanism for automatically configuring a length of the retroreflective sheeting against the marker so that the retroreflective sheeting is precisely affixed the marker.

19 Claims, 4 Drawing Sheets

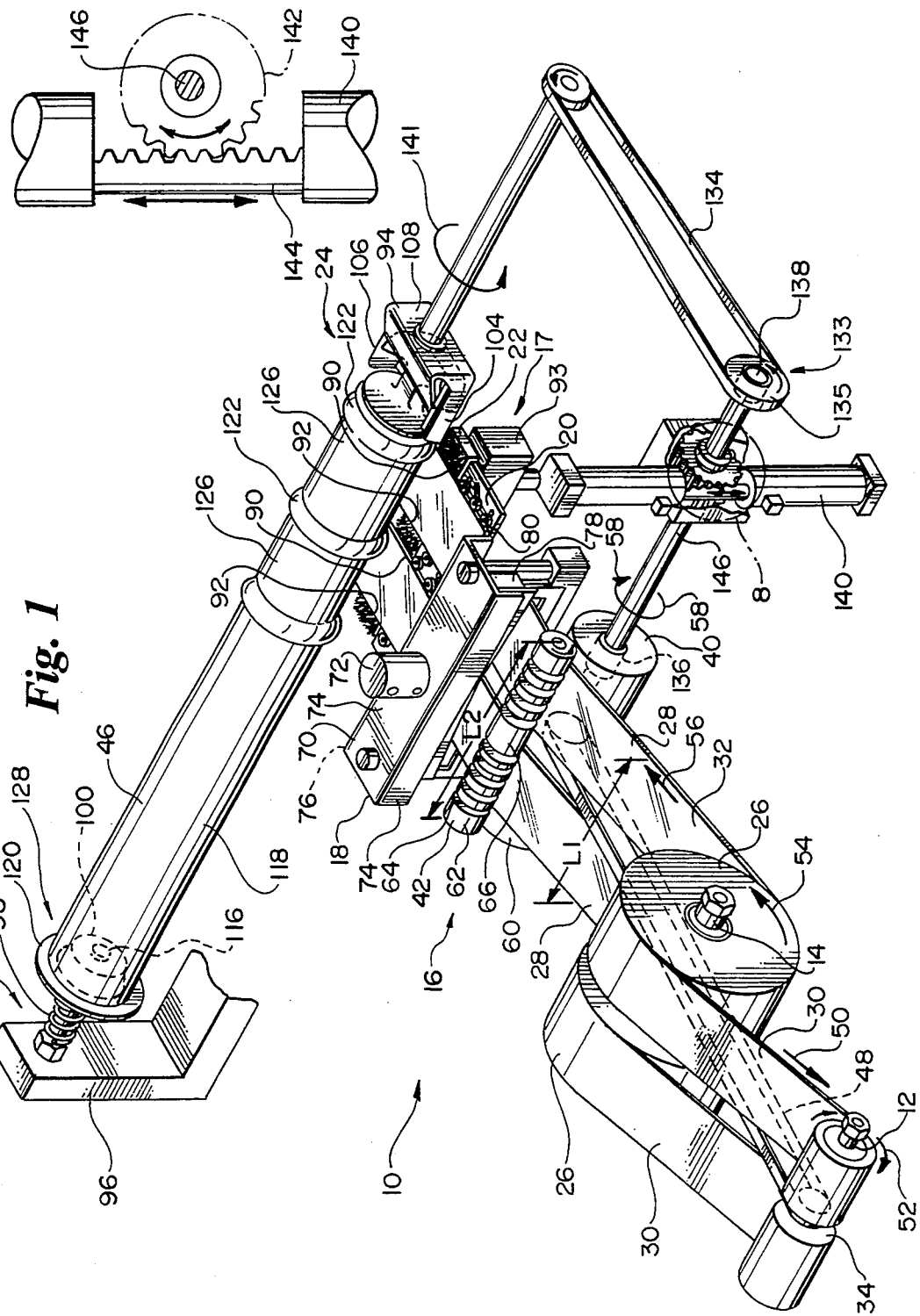

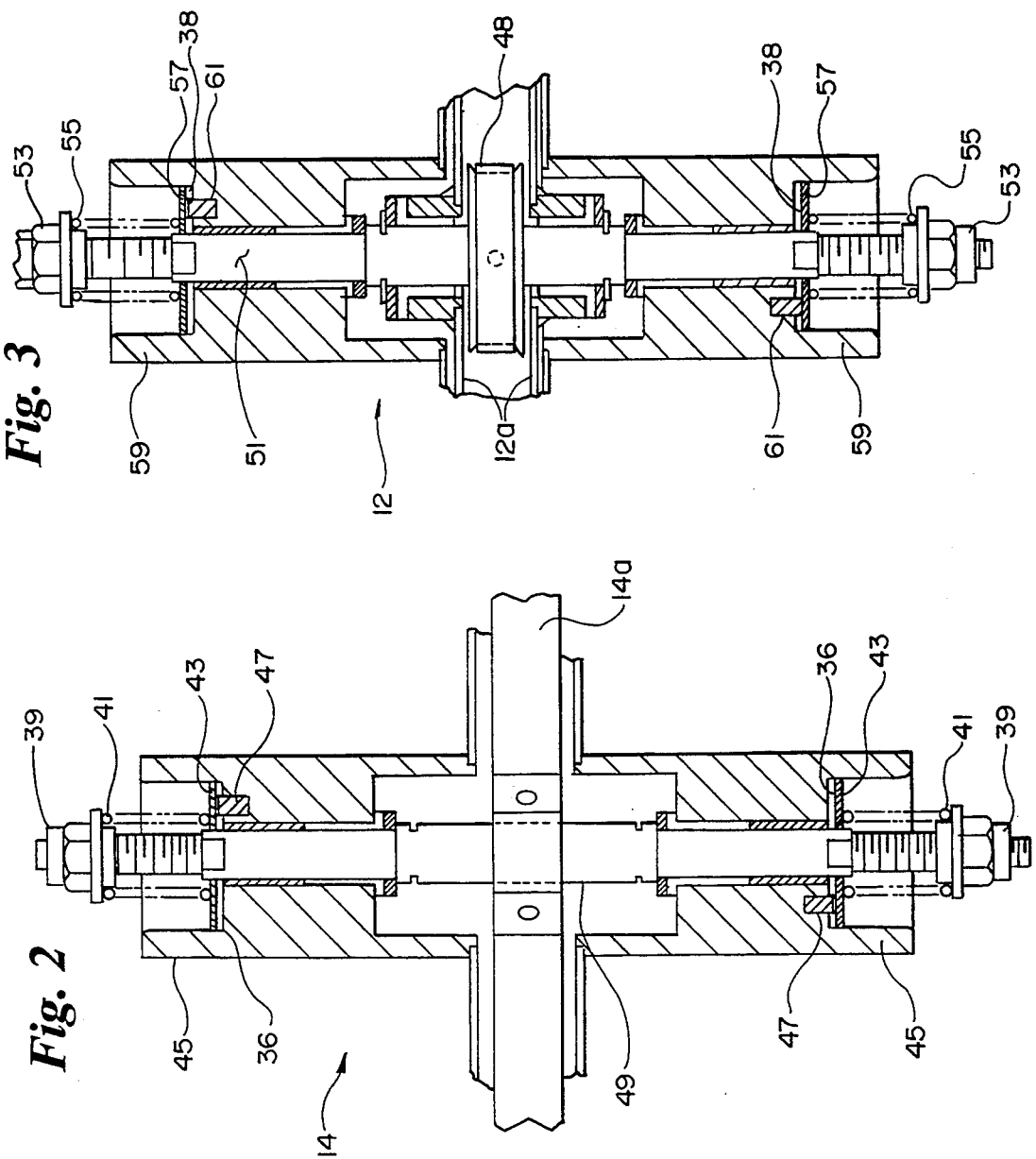

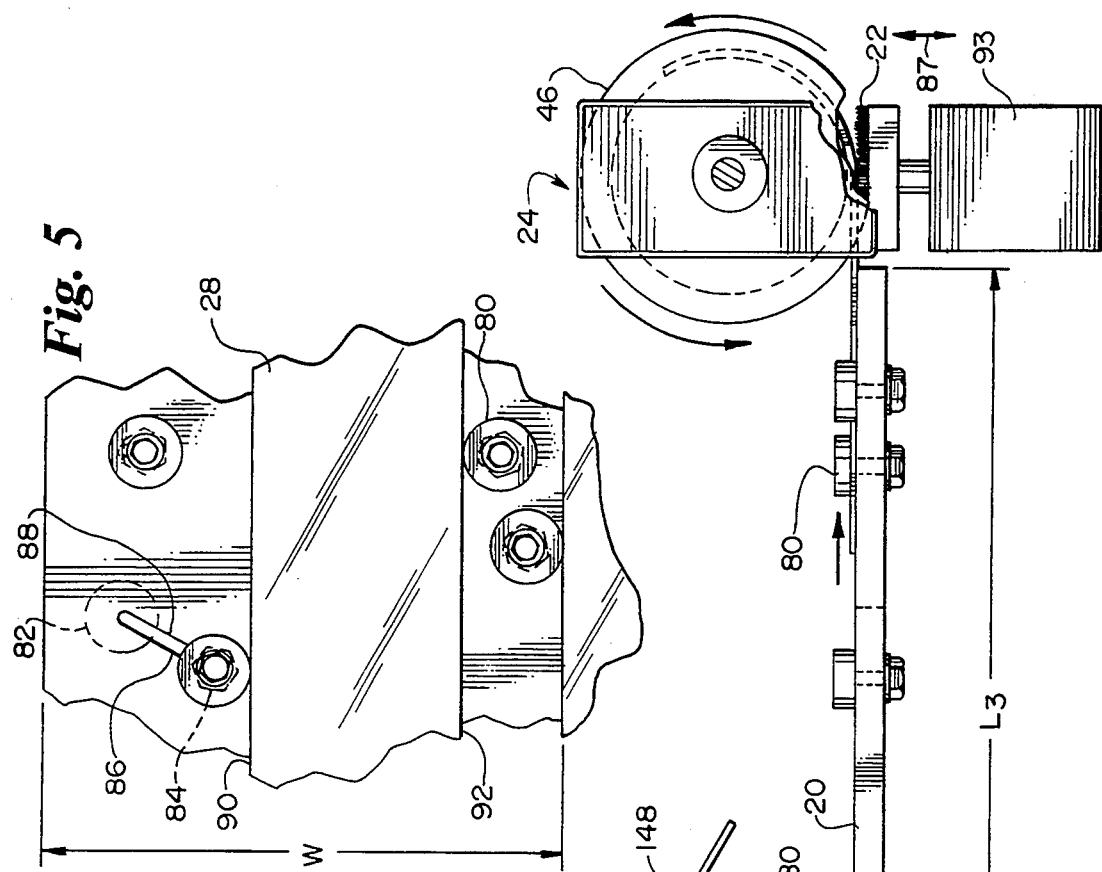
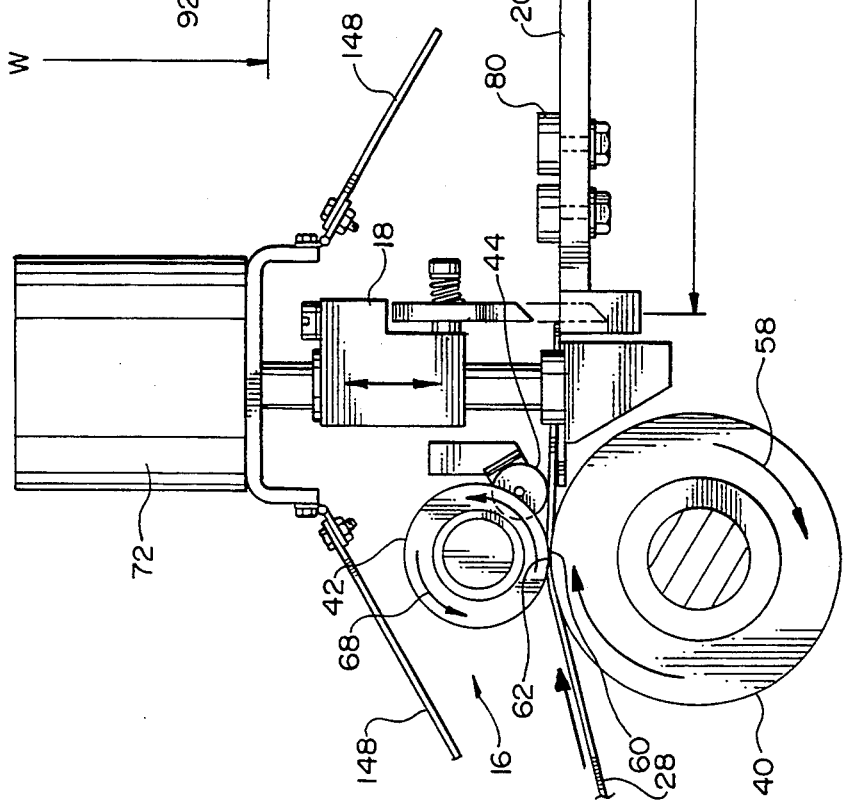

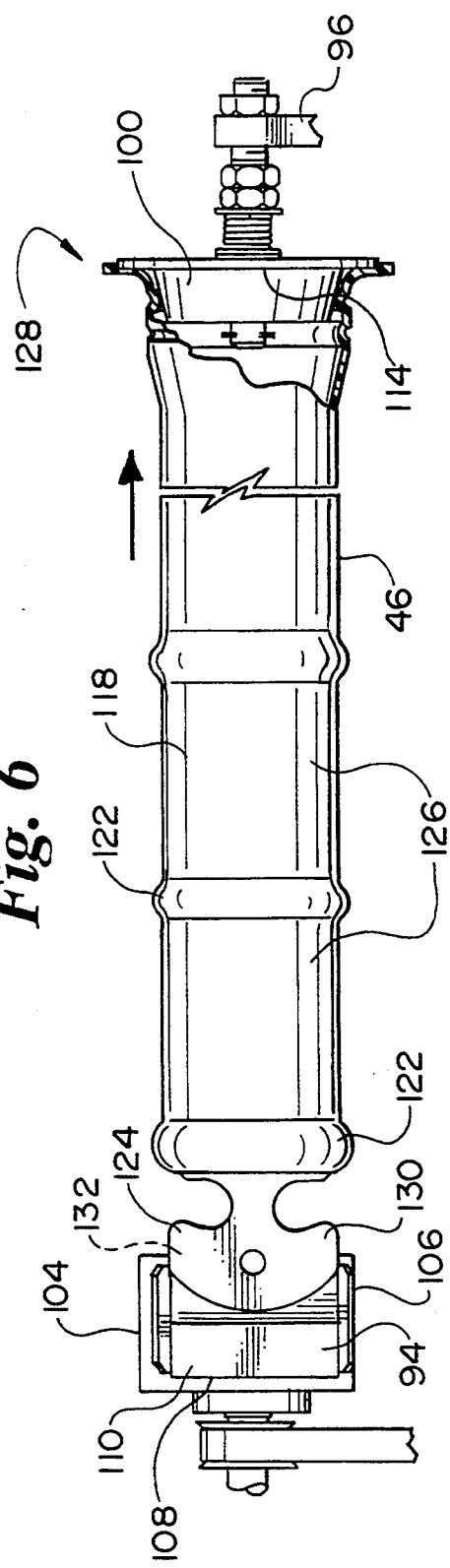
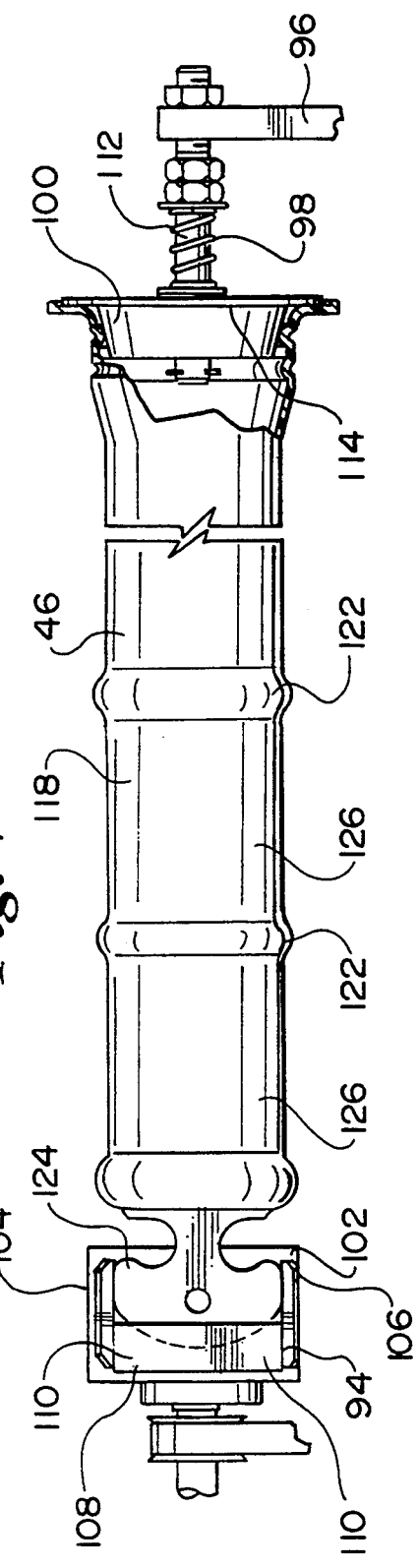

MACHINE FOR WRAPPING TUBULAR MARKERS WITH A REFLECTIVE MATERIAL

FIELD OF THE INVENTION

The invention relates to an apparatus used to apply reflective sheeting to tubular markers. In particular, the invention relates to an automated apparatus for wrapping a plurality of reflective sheeting strips around a tubular marker device used for the channelization of motor vehicle traffic.

BACKGROUND OF THE INVENTION

It is desirable to adhesively apply reflective sheeting material to the exterior of a traffic marker, such as a tubular marker, in order to enhance the visibility of the traffic marker at night or other times of poor visibility.

Application of the reflective material to the tubular traffic markers is very time consuming. One method requires the manual application of the adhesive-backed reflective sheeting material to the tubular marker. The reflective sheeting is cut by hand, and is then manually positioned and applied to the tubular marker. Due to the amount of manual labor required, this is a very slow process.

Another method of applying a reflective material to a traffic marker involves enclosing a piece of reflective sheeting in a sonic welded envelope comprising a clear plastic material. The envelope is formed into a sleeve. The sleeve is slipped onto a heated tubular marker with a significant amount of force, since the sleeve must be forced over the protrusions or dividers on the top section of the tubular markers. Once the sleeve is in position on the tubular marker, the sleeve is riveted in place. Again, this method requires significant amounts of labor, since it takes approximately two minutes to apply the reflective material sleeve to each tubular marker. In addition, this method does not work well since the reflective material does not work effectively when the sleeve is wet. This process also tends to accelerate color loss.

U.S. Pat. No. 5,047,107 issued to Keller et al. discloses a method and apparatus for applying a reflective sleeve to a traffic cone. Reflective sheeting is manually cut, and then manually positioned on a platform. The liner is manually removed from the reflective sheeting material. The cone is manually positioned on a mandrel on the apparatus. The mandrel and platform are brought into proximity with the other. The mandrel automatically winds the reflective material onto the cone, and the cone is then manually removed from the apparatus.

SUMMARY OF THE INVENTION

The invention relates to an automated apparatus for automatic placement of retroreflective materials on markers used for the channelization of traffic. The apparatus includes a spool member to dispense the retroreflective sheeting and receive the liner material removed from the retroreflective sheeting during dispensing. The apparatus also includes a roller mechanism for advancing and positioning the retroreflective sheeting. A drive mechanism for regulating the advancement and position of the retroreflective sheeting to provide a precise length of the retroreflective sheeting according to the size of the marker is also included in the apparatus. The apparatus also comprises a positioning mechanism for automatically configuring a length of the retroreflective sheeting against the marker so that the retroreflective sheeting is precisely affixed to the marker.

The invention also relates to a method for wrapping tubular traffic markers with retroreflective sheeting. The retroreflective sheeting is threaded into a wrapping machine. The tubular marker is then loaded into a holder on the machine. After the machine is activated, the retroreflective sheeting is advanced through a feeder mechanism to a plate member. The retroreflective sheeting is cut, and an edge of the retroreflective sheeting is positioned onto the tubular marker. The tubular marker is rotated, thereby wrapping the retroreflective sheeting around the tubular marker.

BRIEF DESCRIPTION OF THE DRAWINGS

FIG. 1 is a perspective view of a machine for automatic wrapping of tubular markers with reflective material.

FIG. 2 is a cross section view of a supply roll spindle for holding the supply rolls of retroreflective sheeting.

FIG. 3 is a cross section wind up liner spindle for winding the liner material removed from the retroreflective sheeting.

FIG. 4 is a sectional side elevational view of the machine used to wrap tubular markers.

FIG. 5 is a partial sectional view of the plate member showing the adjustment slots for the horizontal guide rollers.

FIG. 6 is a side elevational view showing how the tubular marker is loaded.

FIG. 7 is a side elevational view with the loaded tubular marker in place.

FIG. 8 is an enlarged side elevational view of a portion of the machine of FIG. 1 showing the rack and gear relation.

DETAILED DESCRIPTION OF ILLUSTRATIVE EMBODIMENTS

The invention relates to an automated device for accurately and automatically wrapping traffic markers with a material. In a preferred embodiment, the invention relates to an automated device for accurately and automatically wrapping strips or pieces of adhesive backed retroreflective sheeting around a tubular traffic marker. Tubular markers are generally used in the channelization of motor vehicle traffic, such as during construction or to indicate traffic lane changes, but the markers may be utilized for other purposes, such as the channelization of pedestrian traffic.

FIG. 1 discloses a perspective view of a machine or apparatus 10 for positioning a retroreflective material around a tubular traffic marker. Machine 10 generally comprises a wind-up liner spindle 12, reflective sheeting supply roll spindle 14, a roller feeder mechanism 16, a cutting assembly 18, a positioning mechanism 17 which includes a plate member 20 and a pad member 22, and a tubular marker holder 24. The tubular marker wrap machine 10 rests on a frame (not shown).

Referring to FIG. 1, spool means or reflective sheeting supply roll spindle 14 is used to hold a plurality of reflective sheeting supply rolls 26, and to dispense reflective sheeting 28. As shown in FIG. 1, two rolls 26 of retroreflective sheeting 28 may be positioned on supply roll spindle 14, although this number may vary depending on the end use configuration of the product to which the sheeting is applied. Reflective sheeting 28 may include reflective materials as well as retroreflective materials, and reference throughout this application to reflective sheeting applies interchangeably to retro-reflective sheeting. Reflective sheeting 28 on supply roll 26 is preferably a retroreflective bead-type sheeting, such as 3M Scotchlite brand model PT10/11 reflective sheeting available from Minnesota Mining and Manufacturing Company of Saint Paul, Minn. It is recognized, however, that other types of retroreflective sheeting may be utilized, such as, for example, that known as diamond grade sheeting.

Reflective sheeting 28 on supply rolls 26 is generally available in fifty yard rolls, although this may vary. The width of supply rolls may vary, depending on the width of reflective sheeting desired. Preferably, the width of reflective sheeting 28 ranges from 3 inches to 4 inches (approximately 7.6 cm. to 10.2 cm). Generally in this embodiment, the width of the plurality of rolls 26 positioned on machine 10 is the same, although different width rolls may be utilized at the same time. Preferably, reflective sheeting 28 contains a strengthening material, such as 0.001 inch (0.0254 mm) thick polyester, so that the reflective sheeting 28 has sufficient beam strength for advancement across a positioning mechanism.

Reflective sheeting 28 comprises a layer having a reflective material or coating as discussed above, which is preferably a retroreflective surface. Reflective sheeting 28 also preferably includes a pressure sensitive adhesive layer 32. A removable, releasable liner layer 30 is in contact with the pressure sensitive adhesive surface 32 on reflective sheeting 28. As release liner 30 is removed from the pressure sensitive adhesive surface 32 on reflective sheeting 28, liner 30 is wrapped onto a core or tubing 34 located on spool means or liner wind-up spindle 12. Core or tubing 34 on wind up liner spindle 12 may be made of varying materials, such as cardboard.

Supply roll spindle 14 and liner spindle 12 each include a slip clutch to adjust the drag on supply rolls 26 and tubing 34, respectively, as shown in FIG. 2 and FIG. 3. The slip clutch on supply roll spindle 14 and wind up liner spindle 12 comprises slip clutch disk 36, 38, nut 39, 53, resilient biasing means 41, 55 and space means 43, 57. The slip clutch on supply roll spindle 14 controls the back drag on supply roll 26, thus requiring pull on reflective sheeting 28 to unwind the sheeting. This prevents slack of reflective sheeting 28. In addition, the slip clutch maintains supply rolls 26 in synchronous motion during dispensing of reflective sheeting 28. The slip clutch on liner spindle 12 compensates for the diameter change on liner spindle 12 as liner material 30 is removed from reflective sheeting 28. The slip clutch on liner spindle 12 creates overdrawing of liner material 30 by approximately five percent (5%) so that liner spindle 12 is maintained in a winding, receiving mode.

Referring to FIG. 2, a cross section view of supply roll spindle 14 is shown having two substantially identical sides on either side of a mounting frame 14a for positioning of supply rolls 26. Nut 39 is tightened, which creates tension on resilient biasing means 41, such as a spring. Resilient biasing means 41 pushes against spacer means 43, such as a washer. Spacer means 43 pushes against slip clutch disk 36. Slip clutch disk 36 rotates with hub 45. The drag on supply roll 26 is caused by the interaction of spacer means 43 and slip clutch disk 36. Pin 47 attaches slip clutch disk 36 to hub 45 of supply roll spindle 14. Shaft 49 is fixed within supply roll spindle 14, and does not rotate.

FIG. 3 illustrates a cross section view of wind up liner spindle 12 is shown having two substantially identical portions on either side of a mounting frame 12a. Shaft 51 rotates within liner spindle 12, and is driven by drive belt 48. As in FIG. 2, nut 53 creates tension on resilient biasing means 55. Resilient biasing means 55 pushes against spacer means 57, such as a washer. Spacer mean 57 pushes against slip clutch disk 38. Slip clutch disk 38 rotates with hub 59. Pin 61 attaches slip clutch disk 38 to hub 59 of liner spindle 12. Friction or drag on liner spindle 12 is caused by the interaction between slip clutch disk 38 and spacer means 57.

Referring to FIG. 1 and FIG. 4, feeder mechanism-/roller mechanism 16 generally comprises a drive roller 40, a pinch or nip roller 42, and vertical guide rollers 44. Roller means 16 is preferably proximate liner spindle 12 and supply roll spindle 14. Roller means 16 advances and positions reflective sheeting 28 on positioning member 17. The diameter of drive roller 40 substantially corresponds to the diameter of a tubular marker 46. Thus, the dimensions of the drive roller may vary, also depending on the diameter of tubular markers 46. For example, if a 4 inch (10.2 cm.) diameter tubular marker 46 is utilized, drive roller 40 is approximately 4.14 inches (10.5 cm.) in diameter. The slightly larger diameter of drive roller 40 permits overlap of the ends of reflective sheeting 28 when sheeting 28 is fully positioned around the diameter of marker 46. The length $L_1$ of drive roller 40 should be sufficient to support the plurality of reflective sheeting strips 28 which are advanced to feeder mechanism 16 from supply roll 26. For example, if two reflective sheeting strips 28 which are 4 inches (10.2 cm.) in width are utilized, the length $L_1$ of drive roller 40 should be at least 10.5 inches (26.7 cm.). Drive belt 48 extends from and between liner spindle 12 and drive roller 40, causing liner material 30 and liner spindle 12 to move in the direction of arrows 50, 52. The nip between pinch roller 42 and drive roller 40 causes supply roll spindle 14 and reflective sheeting 28 strips to rotate and move in a direction indicated by arrows 54, 56. Drive roller 40 rotates in only one direction, as indicated by arrow 58 in FIG. 1 and FIG. 4.

As shown in FIG. 4, pinch roller 42 is positioned over drive roller 40 so that the surfaces 60, 62 of drive roller 40 and pinch roller 42 are in contact. Reflective sheeting 28 from supply rolls 26 is positioned between drive roller 40 and pinch roller 42. Pinch roller 42 is used to apply pressure onto drive roller 40, thereby advancing reflective sheeting strips 28 through feeder mechanism-/roller means 16. As shown in FIG. 1, pinch roller 42 includes a plurality of grooves or channels 64 along the length $L_2$ of the pinch roller. Pinch roller 42 is preferably positioned above drive roller 40, and the pinch roller is preferably weighted to assist in the advancement of reflective sheeting through feeder mechanism-/roller means 16. Pinch roller 42 rotates in only one direction, and in a direction opposite to driver roller 40, as indicated by arrow 68 in FIG. 4. Pinch roller 42 may include a nonstick, release coating, such as 934 Release/Traction coating manufactured by Plasma Coatings, Inc. of Bloomington, Minn., to prevent pinch roller from adhering to the adhesive of the reflective sheeting material.

Referring to FIG. 1 and FIG. 4, vertical guide rollers 44 are positioned within grooves 64 of pinch roller 42. The number of vertical guide rollers 44 may vary, depending on the length of pinch roller 42. Vertical guide rollers 44 generally do not come in contact with reflective sheeting 28. Vertical guide rollers 44 prevent reflective sheeting 28 from following and adhering to pinch roller 42. If reflective sheeting 28 starts to stick or adhere to pinch roller 42, vertical guide rollers 44 strip reflective sheeting 28 from pinch roller 42. Vertical guide rollers 44 may include a non-stick, release coating to prevent the pinch roller from adhering to the adhesive of the reflective sheeting material, such as 934 Release/Traction coating manufactured by Plasma Coatings, Inc. of Bloomington, Minn.

Cutting assembly 18 comprises a housing 70 and a cutting mechanism. Referring to FIG. 1, housing 70 generally comprises a top surface 74 and two side surfaces 76, 78. The cutting mechanism 72 comprises a shearing plate which is made of a hard, durable material, such as steel. Air cylinder 72 is used to activate, raise and lower cutting assembly 18 during the cutting of reflective sheeting 28.

Positioning mechanism 17 is positioned between cutting assembly 18 and tubular marker holder 24. Positioning mechanism 17 automatically configures a length of reflective sheeting 28 against marker 46 so that reflective sheeting 28 is precisely affixed to marker 46. Positioning mechanism 17 generally comprises plate member 20, pad member 22, and horizontal guide rollers 80. Plate member 20 extends between cutting assembly 18 and tubular marker holder 24, and is substantially planar. In addition, plate member 20 is sized for the correct length of reflective sheeting 28 which will be applied to marker 46. Plate member 20 may be coated with a material to aid in movement of reflective sheeting 28, such as Silverstone non-sticking coating, manufactured by E. I. DuPont de Nemours of Wilmington, Del.

Referring to FIG. 1, FIG. 4 and FIG. 5, a plurality of horizontal guide rollers 80 may be positioned on plate member 20. Horizontal guide rollers 80 may be adjustable and positionable to accommodate and locate different widths of reflective sheeting 28 with respect to plate member 20. As shown in FIG. 5, at least one of horizontal guide rollers 80 may be positioned between a first, outer position 82 (shown in phantom lines) for reflective sheeting strips having a wider width, such as 4 inches (10.2 cm) wide, and then moved to a second, inner position 84 when reflective sheeting 28 having a smaller width, such as 3 inches (7.6 cm), is utilized. As shown in FIG. 5, the adjustment slots 86 for horizontal guide rollers 80 are at an angle relative to the length $L_3$ and width W of plate member 20. Edges 88 of adjustment slots 86 may be rounded. As strips of reflective sheeting 28 are directed over and across slots 86, reflective sheeting 28 will not engage or jam in slots 86 due to the angle of slots 86 and rounded edges 88. Adjustment slots 86 and horizontal guide rollers 80 are preferably positioned at an acute angle relative to side surfaces 90, 92 of reflective sheeting 28, as illustrated in FIG. 1 and FIG. 5. Generally, if two supply rolls 26 are used, plate member 20 includes two horizontal guide rollers which are positionable within slots 86, one for each roll 26, although this may vary.

Referring to FIG. 1 and FIG. 4, pad member 22 preferably extends between plate member 20 and tubular marker holder 24. Pad member 22, in this embodiment a buffing pad, is raised and lowered in the direction indicated by arrow 87, shown in FIG. 4, by air cylinder 93 to initially position, press, and then apply reflective sheeting 28 onto marker 46. Reflective sheeting 28 is precisely affixed to marker 46 by pad member 22. In addition, as drive means 133 rotates marker 46 for application of reflective sheeting 28, pad member 22 maintains the proper pressure and placement of reflective sheeting 28 on marker 46 during the reflective sheeting 28 application.

Tubular marker mechanism or holder 24 is proximate positioning member 17. Tubular marker holder 24 positions and maintains marker 46 in a specific orientation to receive reflective sheeting 28. Referring to FIGS. 1, 6, and 7, tubular marker holder 24 generally comprises a retaining bracket 94, a support bracket 96, resilient biasing means 98, and a marker support 100 for tubular marker 46. As shown in FIG. 1, FIG. 6 and FIG. 7, retaining bracket 94 includes a generally planar bottom panel 102, two vertical side panels 104, 106, end panel 108, and an inwardly, downwardly angled retaining panel 110. Retaining bracket 94 is made from a durable material, such as steel.

Resilient biasing means, in this embodiment compression spring 98, is supported by horizontal shaft 112 and exerts force against marker support 100. Preferably, in this embodiment, a spring having a compression spring rate of 30 lbs/in (0.538/Kg/mm) is utilized. Marker support 100 slips and rotates on horizontal shaft 112 and is spring loaded by compression spring 98 into end 128 of marker 46. It is recognized that extending structure 116 of marker support 100 is of a generally frusto-conical shape which extends into and supports tubular marker 46 when tubular marker 46 is positioned within tubular marker holder 24.

As shown in FIG. 1, a post or tubular marker 46 is positioned within tubular marker holder 24. Tubular marker 46 generally comprises a rounded or tubular structure. Referring to FIG. 1, FIG. 6, and FIG. 7, tubular marker 46 comprises tubular body 118, ring 120, positioning protrusions 122, grip 124, and indentations 126 for receiving reflective sheeting 28. Reflective sheeting indentations 126 may vary in width, such as 3 inches (7.6 cm.) to 4 inches (10.2 cm.). The number of sheeting indentations 126 on tubular marker 46 may vary. The dimensions of reflective sheeting protrusions 122 may vary, and are used to position, separate and retain the different strips of reflective sheeting 28. Tubular marker 46 is preferably made of a light weight, durable material, such as polyethylene, and may be molded. In addition, tubular marker 46 may be of varying heights. The diameter of tubular marker 46 may vary, but in this embodiment, it is preferably 4 inches (10.2 cm) in diameter. The diameter of tubular marker 46 should substantially correspond to the diameter of drive roller 40 since the diameter of drive roller 40 determines the correct amount and length of reflective sheeting 28 which is advanced toward tubular marker 46. An example of a commercially available tubular road marker 46 which may be used with the present invention is available from Bent Manufacturing.

Referring to FIG. 1, FIG. 6, and FIG. 7, tubular marker 46 is positioned and extends between bracket 96 and retaining bracket 94 of tubular marker holder 24. End 128 of tubular marker 46 is loaded on marker support 100, and resilient biasing means, in this embodiment compression spring 98, is compressed to a sufficient degree to align grip 124 of tubular marker 46 within side panels 104, 106 of retaining bracket 94. Grip surfaces 130, 132 must be substantially parallel to bottom panel 102 of retaining bracket 94. Grip 124 of tubular marker 46 extends partially into retaining bracket 94, pressure applied against compression spring 98 is released, and grip 124 is securely positioned between side panels 104, 106, end panel 108, bottom panel 102, and angled panel 110 of retaining bracket 94, as shown in FIG. 4. Grip 124 may be of varying configurations to fit securely within the bracket 94. Retaining bracket 94 may be configured and adapted to receive different tube end configurations on tubular marker 46.

Tubular marker holder 24 is connected to drive roller 40 by drive means 133 so that tubular marker holder 24 rotates in relation to drive roller 40. Drive means 133 regulates the advancement and position of reflective sheeting 28 to provide a precise length of reflective sheeting 28 according to the diameter size of marker 46. Drive means 133 includes pulley 135, drive belt 134, pinion gear 142, and rack 144. Drive roller 40 includes a one-way bearing 136. Drive pulley 135 includes a one-way bearing 138. Referring to FIG. 1 and FIG. 8, when air cylinder 140 is activated, pinion gear 142 is rotated one revolution by rack 144. Shaft 146 rotatably connected to driver roller 40 rotates in the direction of arrow 58. One-way bearing 136 on shaft 146 locks in position, so that positive traction occurs in drive roller 40. As rack 144, illustrated in FIG. 8, travels in an upwardly direction, one-way bearing 138 on pulley 135 essentially free-wheels. When air cylinder 140 is pushed in an opposite direction, one-way bearing 136 on drive roller 40 essentially free-wheels. One-way bearing 138 on pulley 135 locks, thereby rotating tubular marker holder 24 and tubular marker 46 two revolutions, in the direction indicated by arrow 141. Thus, the drive belt/pulley ratio is preferably 2:1. Tubular marker machine 10 is preferably pneumatically operated.

FIG. 4 is a sectional side elevational view illustrating cutting assembly 18 and tubular marker 46 positioned within tubular marker holder 24. Reflective sheeting 28 is fed through feeder mechanism/roller means 16, passing between pinch roller 42, vertical guide rollers 44, and drive roller 40. The correct length of reflective sheeting 28 corresponding to the diameter of drive roller 40 is fed through feeder mechanism/roller means 16, through cutting assembly 18, over plate member 20, and is positioned on pad member 22. Cutting assembly 18 moves in an up and down motion to cut reflective sheeting 28. Guard brackets 148 may optionally be placed surrounding cutting assembly 18, as shown on FIG. 4. Horizontal guide rollers 80 may be adjusted within slots 86 to compensate for the different widths of reflective sheeting 28 on plate member 20. As shown in FIG. 4, when pad member 22 is raised, reflective sheeting 28 is positioned and tacked onto tubular marker 46. Tubular marker 46 is rotated, as shown in FIG. 4, such that reflective sheeting 28 is automatically wrapped around tubular marker 46 and adhesively attached to tubular marker 46 in indentations 126 between protrusions 122. It is recognized that tubular marker 46 may also be re-positioned within tubular marker holder 24 for the application of reflective sheeting 28 onto distinct reflective sheeting indentations 126 on marker 46.

In operation, two rolls 26 of reflective sheeting 28 are loaded onto supply roll spindle 14 and are properly threaded through the apparatus or machine 10. The air supply source is connected to apparatus 10. An operator loads tubular marker 46 into tubular marker holder 24 by pressing end of tubular marker 46 against marker support 100 and spring 98, so that ring 120 is adjacent surface 114 of marker support 100. Grip 124 of tubular marker 46 is properly aligned within retaining bracket 94. A pneumatic switch is depressed, and tubular marker wrapper machine 10 unwinds and advances the correct length of reflective sheeting 28 from supply rolls 26. As reflective sheeting 28 is advanced, protective liner 30 is stripped from adhesive surface 32 of reflective sheeting 28 and is wound onto liner spindle 12. The ends of the liner material 28 may be taped onto tubing 34 on liner spindle 12, if desired.

An amount of reflective sheeting 28 sufficient in length to fit around the diameter of tubular marker 46 is advanced through roller means 16, cutting assembly 18, and is positioned on plate member 20. Adhesive surface 32 of reflective sheeting 28 is exposed, and is positioned on plate member 20 so that adhesive surface 32 does not come in contact with plate member 20. After a timed delay, such as one (1) second, cutting assembly 18 cuts reflective sheeting 28. Air cylinder 93 is activated so that pad member 22 raises, and tacks the adhesive edge of reflective sheeting 28 against tubular marker 46. Drive belt 134 rotates tubular marker 46 through two revolutions, such that reflective sheeting 28 is adhesively and reliably attached using the pressure applied by pad member 22 to tubular marker 46. Reflective sheeting 28 covers reflective sheeting indentations 126 such that the ends of reflective sheeting strips overlap on marker 46 by approximately ½ inch to ⅝ inch (approximately 1.3 cm. to 1.6 cm.) Pad member 22 then retracts, and tubular marker 46 is removed by an operator.

The automated tubular traffic channelization marker wrapping machine of the present invention has several advantages. First, the automated application of the adhesive-backed reflective sheeting may be applied to the tubular markers at a faster rate than is possible by manual application. For instance, the reflective sheeting strips may be applied to approximately ten (10) tubular markers in a minute using the machine of the present invention. This is significantly faster than manual application or application of sonic welded envelope sleeves. In addition, the reflective sheeting strips are accurately positioned on the tubular markers such that the reflective sheeting is in the same position on each marker. Even if the tubular markers are not uniform in diameter due to manufacturing discrepancies or other variations, the placement of the reflective sheeting is more accurate on the tubular markers using the tubular wrapper machine. Further, the reflective sheeting is automatically cut, and the liner material is automatically removed. Again, this saves significant amounts of time over a manual process. Various modifications and alterations of this invention will become apparent to those skilled in the art without departing from the scope and spirit of this invention.

What is claimed:

1. An automated apparatus for automatic placement of a retroreflective material on markers used for the channelization of traffic, comprising:
   a) spool means for dispensing a retroreflective sheeting and receipt of a liner material removed from the retroreflective sheeting during dispensing;
   b) roller means proximal the spool means for advancing and positioning the retroreflective sheeting material, the roller means comprising a pinch roller, a drive roller, and a plurality of vertical guide rollers to prevent adhesion of the sheeting material to the pinch roller;
   c) drive means for regulating the advancement and position of the reflective sheeting to provide a precise length of retroreflective sheeting according to the size of the marker receiving the sheeting;

d) a marker holder mechanism proximal the roller means for holding the marker in a specific orientation to receive the retroreflective sheeting; and e) a positioning mechanism adjacent the marker holder mechanism for automatically configuring a length of the retroreflective sheeting against the marker so that the retroreflective sheeting material is precisely affixed to the marker.

2. The apparatus of claim 1 wherein the drive roller drives the spool means receiving the liner material.

3. The apparatus of claim 1 wherein the drive means is connected to the roller means and the marker holder mechanism using a one way bearing system so that the marker holder mechanism and the drive roller are synchronized for feed and takeup of retroreflective sheeting material.

4. The apparatus of claim 3 wherein the drive means further comprises a rack and a pinion gear.

5. The apparatus of claim 1 wherein the diameter of the drive roller is substantially the same as the diameter of the marker.

6. The apparatus of claim 1 wherein the roller means further comprises a plurality of vertical guide rollers positioned partially within radial grooves on the pinch roller to prevent adhesion of the sheeting to the pinch roller.

7. The apparatus of claim 1 wherein the positioning mechanism comprises means for sizing a length of the retroreflective sheeting suitable for the marker.

8. The apparatus of claim 1 wherein the positioning mechanism comprises a pad member which is configured for pressing the retroreflective sheeting against the marker.

9. The apparatus of claim 8 wherein the positioning mechanism further comprises a plate member sized for the correct length of sheeting to be applied to the marker.

10. The apparatus of claim 9 wherein the plate member further comprises a plurality of horizontal guide rollers.

11. The apparatus of claim 10 wherein at least one of the horizontal guide rollers is positioned at an acute angle relative to the side surface of the retroreflective sheeting being guided by the horizontal guide roller on the plate member.

12. The apparatus of claim 1 wherein the retroreflective sheeting being dispensed comprises a plurality of rolls of retroreflective sheeting.

13. The apparatus of claim 12 wherein the retroreflective sheeting material comprises a sufficient amount of strengthening material such that the reflective sheeting material has sufficient beam strength to be passed into the positioning mechanism.

14. The apparatus of claim 1 wherein the spool means further comprises clutch means for adjusting the amount of drag on the spool means for dispensing the retroreflective sheeting and the receipt of the liner material.

15. An automated apparatus for automatic placement of retroreflective material on markers used for the channelization of traffic, comprising:

(a) spool means for dispensing a retroreflective sheeting and receipt of a liner material removed from the retroreflective sheeting during dispensing;

(b) roller means proximal the spool means for advancing and positioning the retroreflective sheeting material, the roller means comprising a pinch roller, a drive roller, and a plurality of vertical guide rollers to prevent adhesion of the sheeting material to the pinch roller;

(c) drive means for regulating the advancement and position of the reflective sheeting to provide a precise length of retroreflective sheeting according to the size of the marker receiving the sheeting;

(d) a marker holder mechanism proximal the roller means for holding the marker in a specific orientation to receive the retroreflective sheeting; and (e) a positioning mechanism adjacent the marker holder mechanism for automatically configuring a length of the retroreflective sheeting against the marker so that the retroreflective sheeting material is precisely affixed to the marker, the positioning mechanism comprising a plate member sized for the correct length of sheeting to be applied to the marker and a plurality of horizontal guide rollers on the plate member.

16. The apparatus of claim 15 wherein at least one of the horizontal guide rollers is positioned at an acute angle relative to the side surface of the retroreflective sheeting being guided by the horizontal guide roller on the plate member.

17. The apparatus of claim 16 wherein at least one of the horizontal guide rollers that is configured at an acute angle relative to the side surface of the retroreflective sheeting being guided is adjustably positioned within a slotted surface.

18. An automated apparatus for automatic placement of retroreflective material on markers used for the channelization of traffic, comprising:

(a) spool means for dispensing a retroreflective sheeting and receipt of a liner material removed from the retroreflective sheeting during dispensing;

(b) roller means proximal the spool means for advancing and positioning the retroreflective sheeting material, the roller means comprising a pinch roller, a drive roller, and a plurality of vertical guide rollers positioned partially within radial grooves on the pinch roller to prevent adhesion of the sheeting material to the pinch roller;

(c) drive means for regulating the advancement and position of the reflective sheeting to provide a precise length of retroreflective sheeting according to the size of the marker receiving the sheeting, the drive means being connected to the roller means and a marker holder mechanism using a one way bearing system so that the marker holder mechanism and the drive roller are synchronized for feed and takeup of retroreflective sheeting material;

(d) a marker holder mechanism proximal the roller means for holding the marker in a specific orientation to receive the retroreflective sheeting; and (e) a positioning mechanism adjacent the marker holder mechanism for automatically configuring a length of the retroreflective sheeting against the marker so that the retroreflective sheeting material is precisely affixed to the marker, the positioning mechanism comprising a plate member sized for the correct length of sheeting to be applied to the marker and a plurality of horizontal guide rollers on the plate member.

19. The apparatus of claim 18 wherein the drive means comprises a rack and pinion gear.

* * * * *